United States Patent [19]
Stenne

[11] 3,945,310
[45] Mar. 23, 1976

[54] APPARATUS FOR THE CONTINUOUS PRODUCTION OF CURDS

[75] Inventor: Pierre Stenne, Lozon, France

[73] Assignee: Claudel S.A., Hauts-de-Seine, France

[22] Filed: Sept. 5, 1974

[21] Appl. No.: 503,535

Related U.S. Application Data

[62] Division of Ser. No. 393,848, Sept. 4, 1973, Pat. No. 3,899,595.

[30] Foreign Application Priority Data
Sept. 4, 1972 France .............................. 72.31234
Apr. 16, 1973 France .............................. 73.13766

[52] U.S. Cl. ..................................... 99/452; 99/460
[51] Int. Cl.² ......................................... A23C 19/02
[58] Field of Search ............ 99/453, 443, 452, 460; 426/36, 38, 39, 40, 188, 189, 238, 361

[56] References Cited
UNITED STATES PATENTS

| | | |
|---|---|---|
| 746,016 | 12/1903 | Campbell.............................. 426/38 |
| 966,958 | 8/1910 | Shafer................................. 99/452 X |
| 2,851,363 | 9/1958 | Kielsmeier........................... 426/39 |
| 2,908,575 | 10/1959 | Spiess et al........................ 99/453 X |
| 3,079,263 | 2/1963 | Foster et al........................... 426/39 |
| 3,132,026 | 5/1964 | Radema et al....................... 426/36 |

Primary Examiner—Stanley N. Gilreath
Assistant Examiner—Arthur O. Henderson
Attorney, Agent, or Firm—Blum, Moscovitz, Friedman & Kaplan

[57] ABSTRACT

Apparatus for the continuous production of curds for use in cheese making, wherein renneted or acidified milk or mixture thereof is introduced under pulsation into a conduit whose wall is deformed under the effect of the pulsations and in which the curd is formed, and wherein the curd is collected at the outlet end of this conduit.

11 Claims, 5 Drawing Figures

Fig_3

APPARATUS FOR THE CONTINUOUS PRODUCTION OF CURDS

This is a division, of application Ser. No. 393,848, filed Sept. 4, 1973 now U.S. Pat. No. 3,899,595.

This invention relates to apparatus for the continuous production of curds for making cheese.

The production of curds for making cheese traditionally involves a succession of batch operations such as heating the milk to the renneting temperature, renneting, coagulation, slabbing the coagulum, more or less pronounced syneresis of the curd and moulding thereof. This traditional method is attended by various disadvantages, including dispersion of the physico-chemical and bacteriological characteristics of the various batches of curd obtained, and the difficulty of rationalising the various stages of production. Accordingly, these problems have to be solved by developing processes and apparatus which ensure continuity of the various manufacturing stages by circulating the treated product, whilst at the same time seeking to reproduce the chronology of the operations and the physical and chemical parameters of the various stages involved in the traditional manufacture of curds. Unfortunately, these processes come up against a serious difficulty due to the fact that the coagulum sticks to the walls of the coagulation chamber, generally tubular in shape, in which the product circulates. This is because the formation of aggregates adhering to the wall of the coagulation chamber is an obstacle to the normal circulation of the product and can result in more or less pronounced blockage of the coagulation unit. In addition, when these aggregates drop off the wall of the coagulation chamber, they form lumps of curd whose physico-chemical characteristics differ from those of the rest of the product and impair the homogeneity of the curd obtained.

The present invention seeks to obviate these disadvantages, and relates to apparatus for the continuous product of curds by which it is possible to obtain a curd of uniform quality without any blockage of the coagulation unit. More particularly, the invention relates to apparatus for the continuous production of cheese-grade curds from milk, distinguished by the fact that renneted and/or acidified milk is introduced under pulsation into a conduit whose wall is deformed under the effect of the pulsations and in which the curd is formed, and by the fact that the curd is collected at the output end of this conduit.

In the context of the invention, the term "milk" is intended to designate a milk produced by female mammals, such as cows, she-goats, ewes or cow buffaloes. The milk constituting the starting product according to the invention can be either in its natural state or treated by known methods. Thus, it can be subjected to filtration, pasteurisation and, if necessary, to regulation of its composition before renneting and/or acidification.

The expression "renneted or acidified milk" means that one or more substances promoting the formation of a coagulum have been added to the milk. These substances, known among experts, are either enzymatic systems, such as rennet, or acid substances or lactic ferments producing a certain degree of acidity in the milk. Although curdling of the milk can be satisfactorily carried out by adding one or other of these coagulating agents, it is generally preferred in cheesemongery to use rennet and lactic ferments in combination with one another. In the interests of simplification milk with one or more of these coagulating agents added to it will hereinafter be referred to as "renneted milk".

Although the invention is particularly well suited to the techniques of producing curd which are based on slow coagulation involving a greater risk of the coagulum sticking to the walls of the coagulation chamber, it has also proved to be of interest when the kinetics of coagulation are faster. It can be used for example when the milk is renneted cold and then heated.

In a first embodiment of the invention, the renneted milk is introduced into the coagulation chamber under a pulsating effect, which produces appreciable variations in the rate of flow of the milk, by means of a suitable device such as a variable-output pump, for example a piston pump, or a valve which is alternately opened and closed and whose throughflow cross-section is periodically varied. The coagulation chamber is formed by a conduit in which the milk circulates during coagulation. The geometry of this conduit and the material of which its walls are made are selected in such a way that this wall is deformed under the influence of the pulsations applied to the milk. These pulsations produce elastic expansions and contractions in the wall which are reflected in particular in slight localised variations in the throughflow cross-section of this conduit. These variations in the throughflow cross section counteract the phenomena which cause the coagulum to adhere to the wall, and prevent blockage of the coagulation unit.

This conduit, whose throughflow cross-section is preferably circular, can be in the form of an optionally linear tube whose wall is made of a material with a relatively low modulus of elasticity, for example a plastics material such as polyvinyl chloride. The diameter of tube and the thickness of its wall are selected in such a way that, by virtue of the mechanical characteristics of the material used, the wall is able to undergo local deformation under the effect of the pulsations applied to the flow of renneted milk introduced into the tube.

The throughflow cross-section, the length and the general layout of the conduit (winding, bends, determining its loss of pressure) are of course selected in such a way that the flow pattern of the product, more particularly its linear rate of flow at all points, is compatible with the cohesion requirements of the coagulum formed, and in such a way that the residence time of the product in the conduit is sufficient to enable the coagulum to be formed. On the other hand, the general layout of the conduit is preferably selected in such a way that the milk circulating in the conduit follows an ascending course.

The renneted milk introduced into the coagulation conduit can be prepared either by heating to the so-called renneting temperature, which is of the order of 25° to 40°C, followed by renneting (addition of rennet and/or lactic ferments), or by cold renneting followed by heating. Since these various methods of treating the milk have an appreciable influence upon the kinetics of coagulation, it is advisable to adapt the geometric characteristics of the conduit to these kinetics, in particular the length of this conduit which, for a given rate of supply, determines the residence time of the product in the coagulation unit.

The rate at which the milk is introduced into the coagulation unit and the form of pulsation applied to the flow of milk should be selected in dependence both upon the kinetics of coagulation and upon the geometric and mechanical characteristics of the conduit so as to obtain local deformation of the conduit without at the same time adversely affecting the cohesion of the coagulum formed. The pressure under which the milk is introduced into the coagulation unit should of course be above a minimum value so that it is possible to overcome the loss of pressure introduced by the conduit and the hydrostatic pressure generated if necessary by the difference in level between the inlet end and the outlet end of this conduit.

The coagulum formed is collected at the outlet end of the coagulation conduit by an arrangement which allows draining and then moulding, or moulding and then draining.

In a modification of the first embodiment of the invention, additional deformation can be produced in the coagulation conduit by applying mechanical forces to it, for example by using a helically wound conduit and by locally modifying the winding diameter through the application of radial pressures to the conduit.

It is of course possible to arrange several coagulation units parallel to one another downstream of the systems delivering the milk under pulsation, the performances of these systems being selected in dependence upon the number of coagulation units and their geometric characteristics.

As described above, the coagulum formed is generally fragmented on leaving the coagulation conduit under the effect of its own weight, for example when it is collected on a draining screen. A number of differently sized particles or lumps is formed under these conditions, their distribution being fairly heterogeneous so that they offer a fairly large syneresis surface. A coagulum of this kind is thus particularly suitable for rapid draining and, after draining, forms a curd whose mineral substance, especially calcium, content is relatively high. A curd of this kind, generally referred to in cheesemongery as a "rennet-like curd" can be used with advantage for the manufacture of such cheeses as Pont-l'Eveque or Reblochon.

However, it can be of advantage, for example in the manufacture of such cheeses as camembert or brie, to obtain a curd whose mineral substance content, and especially its calcium content, is considerably lower. A curd of this kind, known in cheesemongery as a "lactic curd", is generally obtained by slow draining which leaves the calcium enough time to react with the lactic acid to form lactates which are eliminated during draining.

It can also be of interest to obtain by controlled draining curds of an intermediate type semi-rennet/-semi-lactic in character which are suitable for the production of such cheeses as Carre de l'Est or Coulommiers.

In a second embodiment of the invention, it is possible continuously to obtain a curd whose degree of fragmentation, which determines the draining rate and, hence, the mineral substance content of the curd, can be adjusted as required. This second embodiment of the invention is distinguished by the fact that the coagulable protein content of the milk is increased, after which the milk is introduced under pulsation, after renneting or acidification or both, into the conduit having a wall which can be deformed under the effect of the pulsations.

In the context of the invention, the expression "coagulable proteins" is intended to designate the proteins, such as casein in its native or non-degraded state, which are able to coagulate under the effect of an enzyme or an enzymatic system responsible for coagulation of the milk, such as rennet, or under the effect of acidification, optionally combined with an enzymatic action. Accordingly, this definition does not include serum proteins (such as lactalbumin) which coagulate under the effect of heat, but are not coagulated either by rennet or by acidification. However, the expression "the coagulable protein content of a milk is increased" by no means excludes the possibility of increasing the content in the milk both of coagulable proteins such as have just been described, and such proteins as serum proteins.

It has been found that the cohesion characteristics of the curd formed in the coagulation conduit, i.e. the ability of this curd to withstand uncontrolled fragmentation, occurring for example spontaneously at the outlet end of the coagulation conduit under the weight of the curd itself, is greatly influenced by the coagulable protein content of the treated milk. This resistance to uncontrolled fragmentation increases when the coagulable protein content of the treated milk increases. Accordingly, it is possible, by adjusting the coagulable protein content of the milk to a suitable value, to collect a coagulum with improved cohesion, which can be more or less pronounced according to requirements, at the outlet end of the coagulation conduit. If necessary, a coagulum of this kind can be subsequently fragmented, for example by slabbing, into pieces of suitable size offering a syneresis surface such that draining takes place at the required rate to give a curd with a suitable mineral substance content after draining.

If, on the other hand, the coagulable protein content of the milk is adjusted to high values, corresponding for example to total concentrations of non-fat solids of the order of 25 to 30 %, it is possible to collect at the outlet end of the coagulation conduit a coagulum of extremely firm consistency which can be cut into unitary slabs corresponding in volume to the required volume of coagulum to obtain, after draining, a unitary cheese. This modification has proved to be of particular interest in the manufacture of cheeses intended to be sold "by the piece", because it enables unitary slabs of curd to be obtained whose weights show greatly reduced dispersion.

This embodiment of the invention also has other advantages, including an improvement in the hourly output of the coagulating machine, which is directly related to the increase in coagulable material content, and simplification of the draining operations because draining can be carried out directly in the moulds by virtue of the relative reduction in the quantity of serum to be eliminated, whilst at the same time controlling the draining rate.

The coagulable protein content of the milk can be increased either by adding a suitable quantity of coagulable proteins to the milk or by treating the milk by a selective filtration process, such as ultrafiltration.

Coagulable proteins can be added to the milk in the form of an aqueous solution of these proteins in their native or non-degraded state in which the concentration of these proteins is higher than in the milk. An aqueous solution of this kind can be obtained by subjecting milk to ultrafiltration or by filtering on gel a milk of which the first elution fraction is collected. It is also possible to add to the milk a dried product, for example in powder form obtained from an aqueous solution of these proteins by drying under such conditions that the coagulable proteins do not undergo any appreciable changes modifying their behaviour with respect to the coagulating agents.

Irrespective of whether it is in the form of an aqueous solution or in the form of a dry product, the coagulable protein concentrate can contain other substances than the coagulable proteins, for example serum proteins. For example, an aqueous solution rich in proteins obtained by ultrafiltration of a skimmed milk is particularly suitable for carrying out the process. A solution such as this can contain for example 18.2 % by weight of coagulable proteins and 6.1 % by weight of serum proteins for a total non-fat solids content of 30 % (the other substances present in this solution being essentially lactose and mineral salts). This solution added in a suitable quantity to the treated milk enables the coagulable protein content to be adjusted to the required value.

If, on the other hand, the coagulable protein concentration of the milk to be treated is increased by subjecting the milk to ultrafiltration, the serum protein content of the milk is increased correlatively in proportions governed by the characteristics of the semi-permeable membrane(s) used.

Such an increase in the serum protein content can prove to be of advantage because it enables a curd to be obtained whose protein content is greater than that of a curd obtained from an equivalent quantity of milk by conventional means. This is also true if the milk has been enriched in proteins by the addition of a protein concentrate containing serum proteins, the comparison having to be made in this case in relation to a curd obtained by a traditional process from the total quantity of milk used, including the quantity of milk used to prepare the protein concentrate.

In one particularly advantageous modification of the second embodiment of the invention, a milk is subjected to an ultrafiltration treatment to increase its coagulable protein content. This treatment comprises separating the milk, by filtration through one or more semi-permeable membranes, into two liquid fractions differing in their chemical composition, and collecting the fraction retained by the semi-permeable membrane, the retained fraction having an appreciably increased protein content. The other fraction, known generally as the "permeate", is an aqueous solution containing substances of relatively low molecular weight, such as lactose and mineral salts, together with certain nitrogen-containing substances. If necessary, the fraction collected can also be subjected to one or more additional ultrafiltration treatments so that it has the required chemical composition. Although the ultrafiltration treatment can be carried out effectively with whole milk, it is generally preferred to use skimmed milk to eliminate the need for frequent cleaning of the semi-permeable membranes.

Ultrafiltration can be carried out by means of a membrane whose permeability is such that the low molecular weight constituents of the milk (lactose, mineral salts, non-protein nitrogen-containing substances) are able to pass through it whilst the constituents of higher molecular weight, notably the coagulable proteins such as casein, are retained. It is possible for this purpose to use standard commercially available membranes, for example those which have been proposed for separating proteins from whey by ultrafiltration. Membranes of this kind can be made of cellulose acetate or synthetic polymers such as polyvinyl chloride or polyacrylonitrile.

The ultrafiltration installation can comprise porous tubes whose internal or external surface is covered by the semipermeable membrane and which are arranged in bundles, or can be formed by porous plates each supporting a semi-permeable membrane and arranged in adjacent frames leaving a suitable interval between the plates. These various types of ultrafiltration systems are also available on the chemical industry market.

The milk is brought into contact with the semipermeable membrane under pressure and preferably in a state of turbulence so as to avoid the polarisation phenomena which adversely affect the output of the operation. The temperature of the milk during ultrafiltration is not a critical parameter providing it remains compatible with the viscosity requirements of the milk and does not in any way impair the integrity of the product treated and of the membranes. This temperature can be adjusted to a value of from 2°C to 70°C, although in the interests of simplification it is generally preferred to carry out ultrafiltration at ambient temperature.

The ultrafiltration treatment is repeated as often as is necessry, depending upon the composition of the product it is desired to obtain, either by arranging an adequate number of membranes in the path followed by the milk or by recycling the milk into the ultrafiltration apparatus. The composition of the liquid product retained, in particular its solids content, is selected in dependence upon the cohesion characteristics of the curd which it is desired to obtain, and upon the type of cheese required. In the case of skimmed milk treated by ultrafiltration, the solids content can reach values of from 10 to 30 % by weight.

If the liquid product has been prepared by ultrafiltration of skimmed milk, a suitable quantity of edible fats is if necessary added to the skimmed milk. These facts can be either of animal origin (for example cream of milk or oil of butter), or vegetable origin (for example peanut oil). The required quantity of fat is selected in dependence upon the type of cheese required. For example, it can be of the order of 45 to 50 % of the weight of the total solids which will be retained in the cheese.

The liquid product, which in the interests of simplification is referred to hereinafter as "ultrafiltered milk", is then heated to the so-called coagulation temperature, which is of the order of 25° to 50°C, followed by the addition of rennet or suitable lactic ferment or mixture thereof selected according to the type of cheese required. Ferments of this kind are well known among experts so that there is no need to describe them in detail here. The addition of rennet or lactic ferments on mixture thereof can of course be carried out continuously by means of metering pumps which introduce these ingredients into the circulating ultrafiltered milk before it enters the actual coagulation conduit. In another modification, the ultrafiltered milk accommodated in a storage tank is inoculated with suitable lactic ferments and then left standing to incubate for a period long enough to ensure that the lactic ferments develop a certain acidity, this period being itself governed by the incubation temperature. When the required pH-value (for example 6.2 for cheese of the camembert type) is reached, the inoculated, ultrafiltered milk is heated to the coagulation temperature, renneted by means of a metering pump as it circulates towards the coagulation conduit and introduced under pulsation into the coagulation conduit.

It is pointed out that the pH-value of the ultrafiltered milk at the renneting stage and its subsequent development have a considerable influence upon the consistency and structure of the curd obtained at the outlet end of the coagulation conduit. For this reason, it is advisable in each case to determine the optimum pH range, especially during renneting and introduction of the ultrafiltered milk into the coagulation chamber, and the coagulation time which determines the condition of the curd at the outlet end of the coagulation chamber, so as to obtain a curd with the required firmness and cohesion.

It has been found that certain characteristics of the curd obtained are closely associated with the non-fat solids content of the ultrafiltered milk. Thus, if the non-fat solids content of this ultrafiltered milk is greater than 15 % by weight, the curd will not readily reintegrate, in other words if this curd is fragmented it will be difficult to obtain a homogeneous curd mass from several fragments. By contrast, if the non-fat solids content of the ultrafiltered milk is less than 15 % by weight, it is possible to cut the curd into slabs of suitable size and to reconstitute a homogeneous curd mass from these slabs by introducing them for example into a draining mould in which they spontaneously reintegrate.

These differences in behaviour of the curd arising out of the non-fat solids content of the ultrafiltered milk enable the second embodiment of the invention to be divided into two principal modifications.

The first modification comprises using an ultrafiltered milk whose non-fat solids content is less than 15 % by weight. After renneting, the ultrafiltered milk is introduced under pulsation into the coagulation conduit. The coagulum formed, whose firmness is more pronounced, the higher the non-fat solids content of the ultrafiltered milk, is obtained at the outlet end of the coagulation conduit in the form of a continuous cylinder which is cut into slabs of suitable size selected in dependence upon the draining rate which it is desired to obtain. These slabs are collected on a moulding and draining arrangement, such as draining moulds in which the slabs of curd drain and reintegrate to form a homogeneous curd mass corresponding to a cheese.

The second modification comprises using an ultrafiltered milk whose non-fat solids content is greater than 15 % by weight. This ultrafiltered, renneted milk is introduced under pulsation into the coagulation conduit. The coagulum formed is obtained at the outlet end of the coagulation conduit in the form of a continuous cylinder. This continuous cylinder is cut into unitary slabs, whose weight corresponds substantially to that of the required cheese, and not into slabs of more or less large dimensions. Thus, to produce cheese of the camembert type for example, the coagulation conduit used is circular in shape with a diameter of approximately 100 mm, and slabs of constant thickness are cut, for example by means of a wire cutter adapted to the rate of advance of the cylinder emerging from the coagulation conduit, whose terminal section is vertically arranged.

The slabs cut, whose consistency and firmness are such that they are easy to handle, can be separated and collected in suitable moulds whose dimensions are preferably slightly greater than those of the cut slabs. The slabs of coagulum arranged in the moulds are slowly deformed to follow the geometry of the moulds and each form a cheese of predetermined weight. In one modification, which can be used when the coagulation conduit has a vertical terminal section, the coagulum is cut without separation of the slabs and, continuing its vertical progression in the form of a stack of unitary slabs, enters a second vertical chamber of identical cross section. This second chamber can then be used as a unit for storing and transporting an assembly of unitary slabs of curd.

So far as this second modification is concerned, it is pointed out that it is preferred to use an ultrafiltered milk whose non-fat solids content is greater than 20 % by weight. The reason for this is that, for a non-fat solids content of this order, the quantity of serum to be removed by draining is small so that there is no need to slab the curd to eliminate this serum.

If, by contrast, an ultrafiltered milk with a non-fat solids content of from 15 to 20 % by weight is used, the quantity of serum to be removed generally necessitates fragmentation of the coagulum. This fragmented coagulum, which is not able to reintegrate, cannot be used for reforming a homogeneous curd mass. However, it is possible to use ultrafiltered milk with a non-fat solids content of from 15 to 20 % by weight in the manufacture of cheese in divided form, such as cottage cheese.

The curd obtained by one or other of these modifications then undergoes the usual operations required to produce the required cheese, such as acidification, salting and ripening.

The invention also relates to an apparatus and comprises at least one coagulation unit in the form of a conduit, in which the coagulum is formed, and means for introducing and circulating the renneted or acidified or renneted and acidified milk in this conduit, and is distinguished in particular by the fact that it comprises means for applying pulsation to the flow of milk entering the conduit, and by the fact that the wall of this conduit is capable of deforming under the effect of these pulsations.

The coagulation conduit is preferably in the form of a circular tube whose constituent material is a material with a low modulus of elasticity which is capable of undergoing elastic deformation under the effect of relatively weak stresses, such as a polyvinyl or polyethylene polymer for example. Although this coagulation conduit can be arranged in a straight line, it is preferred to wind it helically to save space.

The milk can be introduced into and circulated in the coagulation conduit by means of any suitable device, such as a centrifugal pump or the like, or simply by the application of pressure.

The pulsating effect applied to the flow of milk can be obtained by means of numerous types of devices such as pulsating pumps, for example piston pumps which not only circulate the milk, but also pulsate it in the required manner. It is also possible to use, in combination with a circulating means (pump or pressurisation), a valve which can be alternately opened and closed or whose throughflow cross-section can be periodically varied, for example a pneumatically or electrically controlled valve.

Several embodiments of the apparatus according to the invention are illustrated by way of example in the accompanying drawings, wherein:

FIG. 1 diagrammatically illustrates a first embodiment of the invention.

Figure 4:
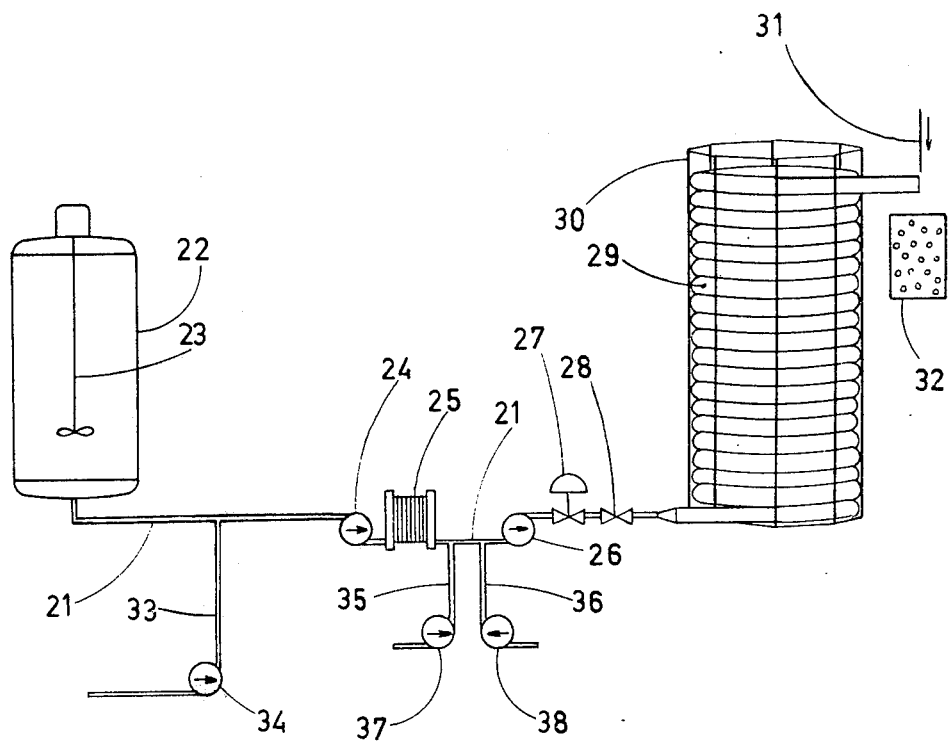

FIG. 4 diagrammatically illustrates a second embodiment of the invention.

Figure 5:
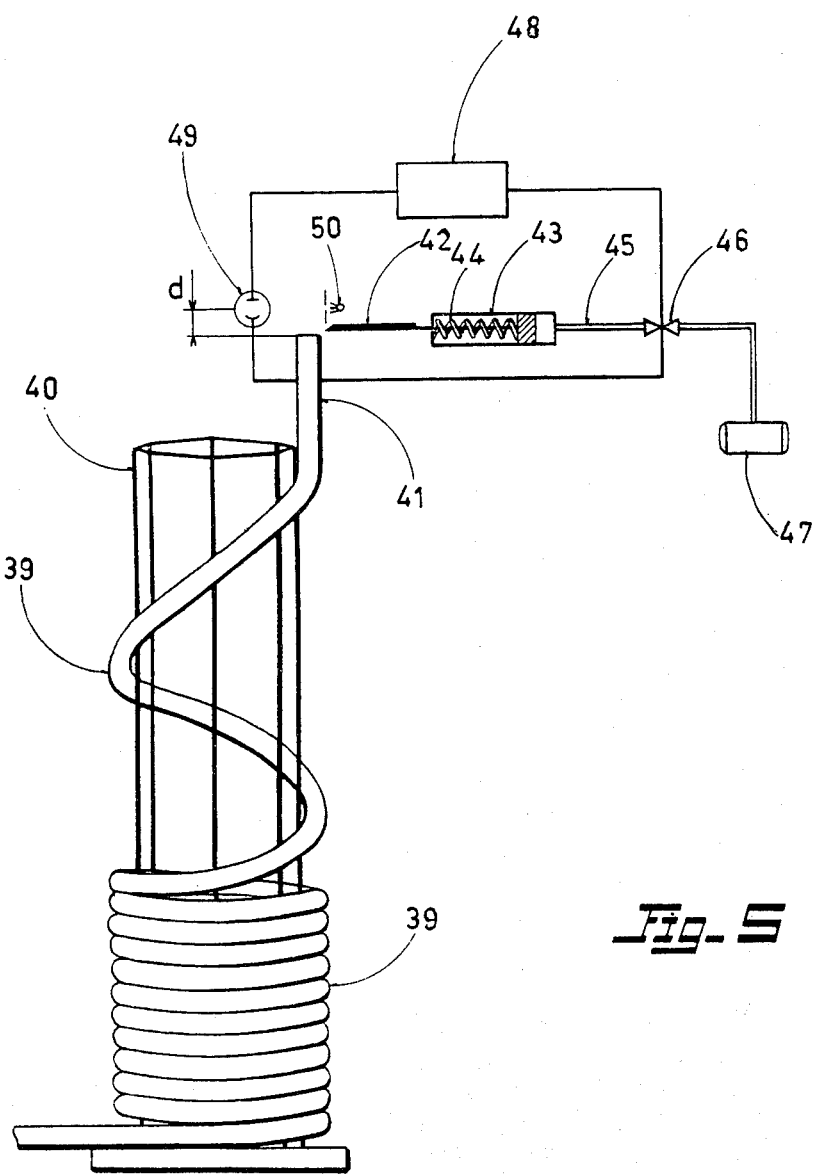

FIG. 5 is a partial view of an installation constituting a modification of the installation illustrated in FIG. 4.

Figure 1:
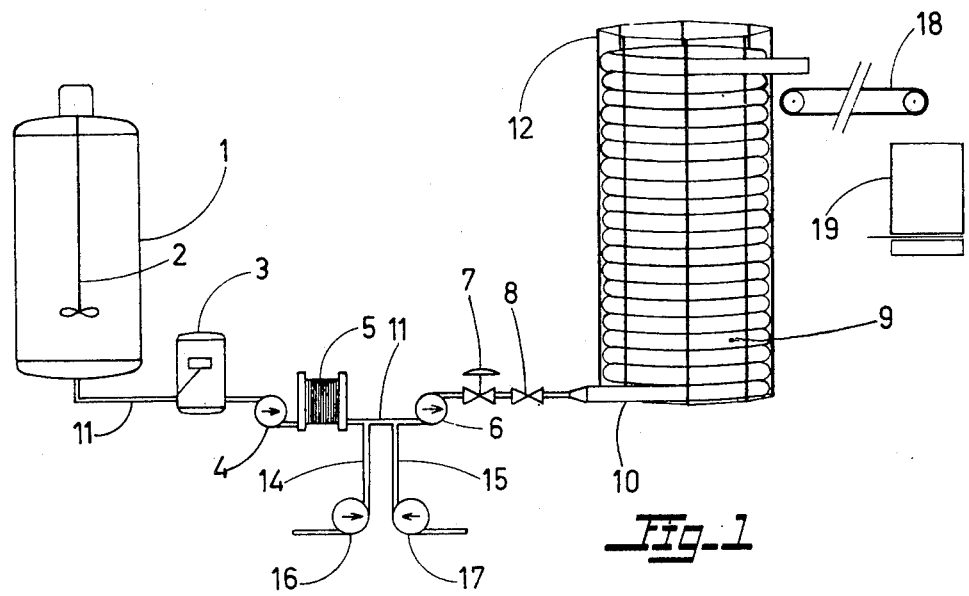
Figure 2:
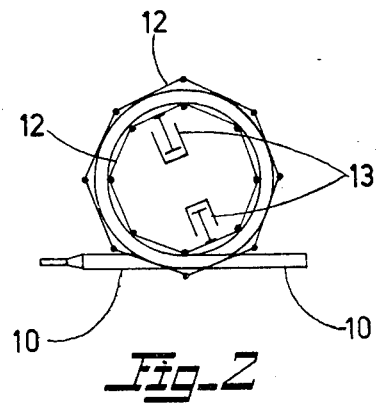
FIG. 2 is a plan view of the coagulation unit shown in FIG. 1.

As shown in FIG. 1, the installation comprises the following components connected in series in the order listed by a pipeline 11: a storage tank 1 equipped with a stirrer 2 and a device for keeping it at a constant temperature (not shown), a constant-level chamber 3, a centrifugal pump 4, a plate heater 5, a centrifugal pump 6, a pneumatically controlled valve 7, a variable-opening valve 8, and a coagulation unit 9 in the form of a helically wound tube 10 of polyvinyl chloride. This tube 10, which has a diameter of 100 mm, a thickness of 2 mm and a length of 20 m, is arranged in an octagonal frame 12. This frame is subjected to the action of pneumatic jacks 13 (shown in FIG. 2) and is capable of deforming to such an extent that the radius of curvature of the helical tube 10 is modified by about 30 %.

The installation also comprises two pipelines 14 and 15 connected in parallel to that section of the pipeline 11 situated between the heater 5 and the pump 6. By means of the pipelines 14 and 15 equipped with metering pumps 16 and 17, respectively, it is possible to introduce the quantities of lactic ferment and rennet required to obtain the type of cheese desired. These additives are intimately mixed with the milk by the centrifugal pump 6.

Finally, the installation comprises a drainage screen 18 in the form of a moving belt which is permeable to liquids. A perforated hopper 19, whose cross-section is several times greater than that of the required cheese, is arranged beneath the screen 18 to collect the drained curd.

The installation shown in FIG. 4 comprises a certain number of components arranged in series and connected by a pipeline 21. These components, listed in the order in which they are arranged in the downstream direction, are the following:
- a storage tank 22 for the ultrafiltered milk equipped with a stirrer 23 and a device for keeping it a constant temperature (not shown),
- a centrifugal pump 24,
- a plate heater 25,
- a centrifugal pump 26,
- a pneumatically controlled valve 27,
- a variable-opening valve 28,
- a coagulation unit in the form of a polyvinyl chloride tube 29 wound helically on a metal frame 30,
- a slabber 31 in the form of a blade or stretched wire displaced vertically by a pneumatic jack (not shown),
- a receptacle 32 in the form of a perforated hopper or a mould whose perforated wall allows the serum to flow out.

This installation comprises a pipeline 33 equipped with a variable-output pump 34 and connected to the pipeline 21 between the tank 22 and the centrifugal pump 24. This pipeline 33 enables the required quantity of fats to be continuously added to the ultrafiltered milk. The installation also comprises two pipelines 35 and 36 connected in parallel to the pipeline 21 between the heater 25 and the centrifugal pump 26. These pipelines 35 and 36, equipped with metering pumps 37 and 38, respectively, enable the required quantities of lactic ferment and rennet to be continuously introduced.

FIG. 5 is a view of the coagulation and slabbing unit of one modified embodiment of the installation. This modified embodiment is particularly suitable for use with ultrafiltered milk whose non-fat solids content is relatively high, for example of the order of 20 to 30 % by weight.

The first section of an installation of this kind, i.e. the components situated upstream of the coagulation unit which are not shown in FIG. 5, is similar to that illustrated in FIG. 4.

The coagulation unit is in the form of a polyvinyl chloride tube 39 wound helically on a metal frame 40. The upper part of the tube 39 is wound around the frame 40 with a higher pitch, and terminates in a vertical section 41 so that the curvature of this upper section is not more pronounced than that of the lower spirals so as not to interfere with the advance of the coagulum through the tube.

The installation also comprises a cutting unit with a cutter 42 displaced horizontally by a pneumatic jack 43 equipped with a return spring 44. This pneumatic jack is connected through a pipe 45 equipped with an electric valve 46 to a source 47 of compressed air. The electric valve 46 is regulated by an electric control device 48 which is itself connected to a photoelectric cell 49. This photoelectric cell is arranged at a predetermined height $d$ above the outlet end of the tube 39 in relation to a light source 50 emitting a light beam directed horizontally towards the cell 49. When the cylinder of curd emerges from the tube 39 at the height $d$, it interrupts the light beam so that the photoelectric cell transmits a signal which, through the electric control device 48, closes or opens the electric valve 46 and operates the cutter 42. The following signal operates the cutter in the opposite direction. Accordingly, it is possible by this arrangement to cut unitary slabs of curd of constant thickness.

The following examples illustrate the invention, although it is by no means confined to the conditions described therein.

EXAMPLE 1

A milk containing 34 g/l of fats, stored at 10°C in the tank 1, is heated to 35° through circulation in the plate heater 5. 1 % by volume of a ferment consisting of an association of *Streptococcus lactis*, *Streptococcus cremoris*, *Streptococcus citrovorus* and *Streptococcus diacetilactis*, and 0.03 % by volume of a rennet with a strength of 1/10,000, are then introduced into the milk circulating in the pipeline 11 by means of the metering pumps 14 and 15. The lactic ferment and the rennet are intimately mixed with the milk by the centrifugal pump 6 whose output is at least twice the total output of the installation. The pneumatically controlled valve 7 is operated by an automatic device which closes it for 1 second and then opens it for 1 second in repetitive fashion. This operation of the valve produces a pulsating effect upon the flow of milk which in turn produces deformation of the coagulation conduit 10 reflected in local variations in the diameter of the conduit of the order of 0.15 %. The opening of the valve 8 is regulated to adjust the rate of flow to 940 liters per hour, which corresponds to an average linear rate of flow of the milk during coagulation in the tube 10 of the order of 2 meters per minute, and to a residence time of the product in the coagulation unit of the order of 10 minutes.

Figure 3:
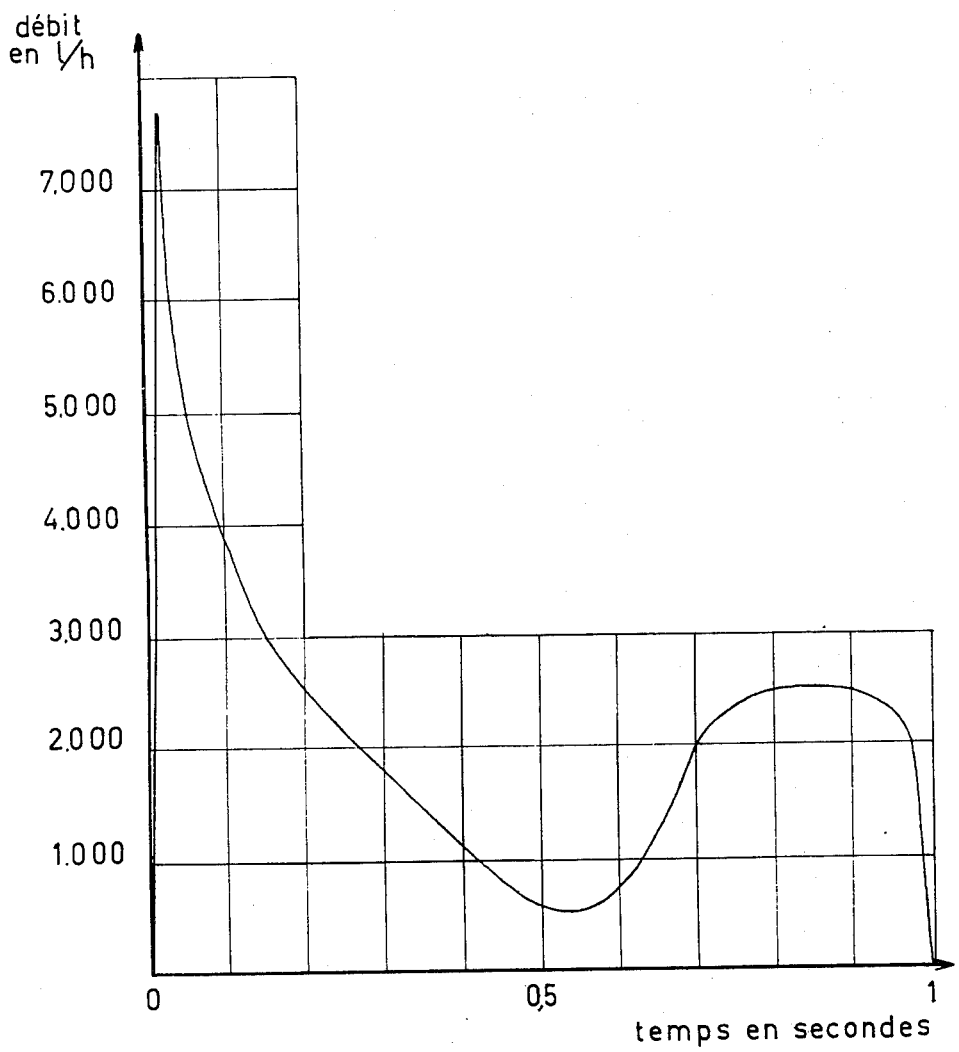
FIG. 3 is a curve showing the variation, as a function of time, in the output per second of product obtained at the outlet end of the coagulation unit shown in FIG. 1.

The pulsating effect produced by opening and closing the valve 7, which is reflected in a periodic variation in the output of product at the outlet end of the coagulation unit, is illustrated in FIG. 3.

On the other hand, pressures are periodically applied to the frame 12 by means of the jacks 13, thus modifying the radius of curvature of the helical conduit by about 30 %.

The curd collected at the outlet end of the conduit 10 is distributed onto the drainage screen 18 whose drainage rate is regulated to 2 meters per minute. The drained curd then drops into the hopper 19 where it is available for moulding and the subsequent operations involved in the manufacture of cheese.

EXAMPLE 2

This Example, illustrates the use of in the installation shown in FIG. 4.

2000 liters of a skimmed milk containing 9 % by weight of non-fat solids are subjected to an ultrafiltration treatment to obtain 947 liters of an ultrafiltered milk containing 13 % by weight of non-fat solids.

The ultrafiltration treatment is carried out in an apparatus comprising, in series, 10 sub-assemblies, each sub-assembly being formed by 5 porous plates arranged parallel to one another and supporting on their two surfaces a semi-permeable membrane with a surface area of about 0.1 m². This ultrafiltration system is manufactured by Societe Rhone. Poulenc (Paris), and the membranes, which have a total surface area of 10 m², bear the name "type Iris 3069". The skimmed milk is introduced into the ultrafiltration arrangement at a rate of 6000 liters per hour, which makes it possible to establish suitable turbulence conditions, and is recycled in this arrangement for 13 hours by way of a buffer tank. The 947 liters of ultrafiltered milk collected in the buffer tank are transferred to the tank 22 where they are stored at 20°C. The ultrafiltered milk has the following composition:
lactose 5.0 %
mineral salts 0.7 %
casein 5.75 %
soluble proteins 1.55 %

The ultrafiltered milk is then introduced at a rate of 300 liters per hour into the conduit 21 where cream of milk containing 60 % of fats is added to it continuously at a rate of 28 liters per hour through the pipeline 33 by means of the pump 34.

The ultrafiltered milk with the fats added to it is then transported by means of the pump 24 and enters the heater 25 in which it is heated to 35°C. 1% by volume of a ferment consisting of an association of *streptococcus lactis, Streptococcus cremoris, Leuconostoc citrovorum* and *Streptococcus diacetylactis*, and 66 cm³/h of a rennet of strength 1/10,000, are then introduced into the heated, ultrafiltered milk by means of the metering pumps 37 and 38. The lactic ferment and the rennet are intimately mixed with the ultrafiltered milk by the pump 26.

The pneumatically controlled valve 27 is operated by means of an automatic device which opens it for 0.5 seconds and then closes it for 0.5 seconds in a repetitive manner. This repeated opening and closing of the valve produces a pulsating effect in the flow of ultrafiltered milk which in turn produces deformations in the coagulation tube 29 which has an internal diameter of 80 mm, a thickness of 1.5 mm and a length of 22 m. The opening of the valve 28 is regulated to adjust the rate of flow of product through the coagulation tube to 334 l/h, which corresponds to an average linear velocity of the product of the order of 1.1 meter per minute, and to a residence time of the product in the coagulation unit of around 20 minutes.

The curd collected at the outlet end of the conduit 29 is in the form of a homogeneous cylinder which is fragmented by the cutter 31 into approximately 15 cc. pieces which are collected in drainage moulds arranged on a turntable. The curd deposited into these moulds drains and reintegrates. It is then subjected to the conventional operations involved in the manufacture of cheese.

EXAMPLE 3

1000 liters of a skimmed milk containing 9 % of non-fat solids are subjected to an ultrafiltration treatment to obtain 185 liters of an ultrafiltered milk with a non-fat solids content of 25.5 % by weight.

This ultrafiltration treatment is carried out in the apparatus described in Example 2. The skimmed milk is introduced into the ultrafiltration apparatus at a rate of 6000 liters per hour and is recycled in this apparatus for 10 hours by way of a buffer tank. The 185 liters of ultrafiltered milk collected are transferred to the tank 22 where they are stored at 20°C. The ultrafiltered milk has the following composition:
lactose 5.0 %
mineral salts 0.7 %
casein 15.6 %
soluble proteins 4.2 %

The milk is introduced at a rate of 100 liters per hour into the pipeline 21 where cream of milk with a 60 % fat content is added to it continuously at a rate of 30 liters per hour through the pipeline 33 by means of the pump 34.

The ultrafiltered milk then enters the heater 25 where it is heated to a temperature of 35°C. 2 % by volume of the lactic ferment described in Example 2 and 26 cc/h of a rennet of strength 1/10,000, are then continuously introduced into the ultrafiltered milk by means of the metering pumps 37 and 38. The pneumatically controlled valve 27 is operated in the same way as described in Example 2 to produce a pulsating effect in the flow of ultrafiltered milk. The average rate of flow of the ultrafiltered milk is adjusted to 132 liters per hour by means of the valve 28.

The coagulation and cutting untis used in this Example are shown in FIG. 5. The coagulation unit is in the form of a coagulation tube 39 of polyvinyl chloride with an internal diameter of 80 mm, a thickness of 1.5 mm and a length of 6.5 m. The product circulates in the coagulation tube at an average linear velocity of 44 cm per minute, which corresponds to a residence time of the product in the coagulation unit of 15 minutes.

The curd emerging at the outlet end of the vertical section 41 of the tube 39 is in the form of a firm, homogeneous cylinder which is cut into unitary slabs 30 mm thick by means of the cutter 42 controlled by the photoelectric cell 49.

These unitary slabs are removed and deposited into moulds whose diameter is slightly greater than theirs and subsequently undergo the conventional operations involved in the manufacture of cheese.

I claim:

1. An apparatus for the continuous production of curds for use in cheese making, comprising at least one coagulation unit in the form of a conduit in which the coagulum is formed, means for introducing and circulating renneted milk in this conduit, the term "renneted milk" indicating herein milk to which has been added one or more substances promoting the formation of a coagulum, such substances including enzymatic systems of which rennet is an example, acid substances and lactic ferments, and means for applying a pulsating effect to the flow of milk introduced into the conduit, and wherein the wall of this conduit is capable of being deformed under the effect of these pulsations.

2. An apparatus as claimed in claim 1, wherein the means applying pulsations to the flow of milk entering the conduit also circulate the milk.

3. An apparatus as claimed in claim 2, wherein the aforementioned means are in the form of at least one pulsating pump.

4. An apparatus as claimed in claim 1, wherein the means applying the pulsating effect to the flow of milk entering the conduit consist of at least one valve positioned in the path followed by the milk circulating upstream of the aforementioned conduit.

5. An apparatus as claimed in claim 4, further comprising automatic control means for controlling said valve.

6. An apparatus as claimed in claim 5, further comprising an automatic device adapted for periodically opening and closing said valve.

7. An apparatus as claimed in claim 1, wherein the conduit is in the form of a tube made of a material with a low modulus of elasticity.

8. The apparatus as claimed in claim 1, further comprising a frame about said conduit, said conduit being in the form of a helically wound tube accommodated in said frame.

9. An apparatus as claimed in claim 8, further comprising means for applying external mechanical forces to said conduit in order to deform it, and wherein the means for applying the mechanical forces are adapted to cooperate with said frame to modify the winding diameter of the conduit.

10. An apparatus as claimed in claim 1, wherein said apparatus comprises means for applying external mechanical forces to the conduit in order to deform it.

11. An apparatus as claimed in claim 1, wherein said conduit has a vertical terminal section with an upper edge, and said apparatus further comprises a cutting unit positioned above said upper edge of said conduit for acting in a substantially horizontal plane.

* * * * *